United States Patent [19]
van der Lely

[11] 4,436,161
[45] Mar. 13, 1984

[54] SOIL CULTIVATING IMPLEMENTS

[76] Inventor: Cornelis van der Lely, 7 Brüschenrain, Zug, Switzerland

[21] Appl. No.: 348,356

[22] Filed: Feb. 12, 1982

[30] Foreign Application Priority Data

Feb. 18, 1981 [NL] Netherlands .................. 8100784

[51] Int. Cl.³ .................. A01B 33/06; A01B 33/12
[52] U.S. Cl. .................. 172/49.5; 172/68; 172/112; 172/509; 403/157
[58] Field of Search .......... 172/49.5, 68, 112, 113, 172/159, 508-513; 403/157-159, 91, 92

[56] References Cited

U.S. PATENT DOCUMENTS

| 213,948 | 4/1879 | Simmons | 172/513 X |
|---|---|---|---|
| 546,675 | 9/1895 | Nuckolls | 172/509 |
| 723,165 | 3/1903 | Landis | 403/159 |
| 846,876 | 3/1907 | Toepfer | 172/509 |
| 977,971 | 12/1910 | Sewell | 172/509 X |
| 1,000,961 | 8/1911 | Berven | 172/509 |
| 1,147,814 | 7/1915 | Petsch | 172/509 |
| 1,157,129 | 10/1915 | Starr | 172/509 X |
| 2,409,879 | 10/1946 | McIntosh | 403/92 |
| 3,175,622 | 3/1965 | Stam | 172/159 |
| 3,331,449 | 7/1967 | Blocker | 172/159 |
| 3,909,055 | 9/1975 | Koppel | 403/157 X |
| 4,051,904 | 10/1977 | van der Lely et al. | 172/112 X |
| 4,083,411 | 4/1978 | van der Lely | 172/49.5 |
| 4,088,083 | 5/1978 | Dail, Jr. et al. | 172/68 X |
| 4,354,557 | 10/1982 | van der Lely et al. | 172/49.5 |

FOREIGN PATENT DOCUMENTS

| 592785 | 2/1960 | Canada | 172/113 |
|---|---|---|---|
| 2834670 | 2/1979 | Fed. Rep. of Germany | 172/49.5 |
| 2833399 | 2/1980 | Fed. Rep. of Germany | 172/112 |

Primary Examiner—Paul E. Shapiro
Attorney, Agent, or Firm—Penrose, Lucas, Albright, Mason, Mason & Albright; Penrose Lucas Albright

[57] ABSTRACT

A soil cultivating implement having an elongated frame portion which extends substantially horizontally perpendicular to the direction of travel of the implement mounts a side plate at each lateral end. The frame portion carries a row of rotary tined soil working members and the side plates can move upwardly and downwardly to cooperate with the adjacent soil working members and a rear supporting roller. In order to prevent the formation of the stream of soil produced by this cooperation into a ridge, the side plate comprises a rim having a lower substantially horizontal ground-engaging portion and also comprises a rear surface that is bent over inwardly towards the center of the implement to deflect the stream of soil towards the neighboring end of the following ground roller when the implement is in operation.

11 Claims, 11 Drawing Figures

SOIL CULTIVATING IMPLEMENTS

SUMMARY OF THE INVENTION

This invention relates to soil cultivating implements or machines of the kind which comprise an elongate frame portion extending substantially horizontally perpendicular, or at least transverse, to the intended direction of operative travel of the implement or machine and carrying a plurality of soil working members that are rotatable about upwardly extending (nonhorizontal) axes, a displaceable side plate being provided at at least one end of the elongate frame portion to co-operate with an adjacent one of said rotary soil working members in cultivating the soil. The term implement or machine will be shortened to implement alone throughout the remainder of this document for the sake of brevity.

Known implements of this kind are somewhat prone, and particularly when cultivating the ground to a considerable depth, to accumulate soil between rear regions of their displaceable side plates and the adjacent ends of a ground roller arranged behind the rotary soil working members, such accumulated soil being left on the ground surface in the form of longitudinally extending ridges or the like. An object of the present invention is to minimize, if not completely eliminate, this disadvantage and, accordingly, one aspect of the invention provides a soil cultivating implement of the kind set forth, wherein a lower region of each displaceable side plate is provided with guide means comprising a horizontal or substantially horizontal portion extending lengthwise relative to the intended direction of operative travel of the implement and an adjoining or adjacent downwardly extending portion that is directed inwardly with respect to the center of the implement in a rear region of the side plate relative to said direction of travel.

Guide means of considerable length in the intended direction of operative travel of the implement can readily be provided in this way and will deflect the soil, inwardly towards the neighboring end of the immediately following ground roller for preventing the aforementioned. The horizontal portion of the guide means ensures that the adjoining or adjacent downwardly extending portion which principally effects the guiding action will tend always to maintain an optimum position for deflecting co-operation with the stream of displaced soil. For a better understanding of the invention, and to show how the same may be carried into effect, reference will now be made, by way of example, to the accompanying drawings, in which:

DESCRIPTION OF THE PREFERRED EMBODIMENT

Figure 1:
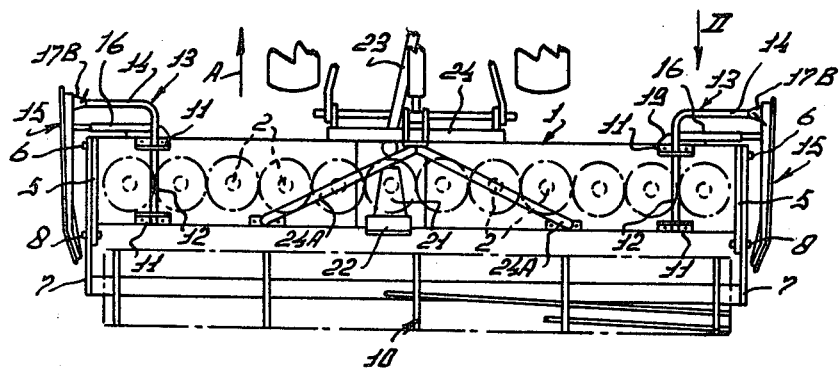
FIG. 1 is a plan view of a soil cultivating implement in accordance with the invention shown connected to the rear of an agricultural tractor.
Figure 2:
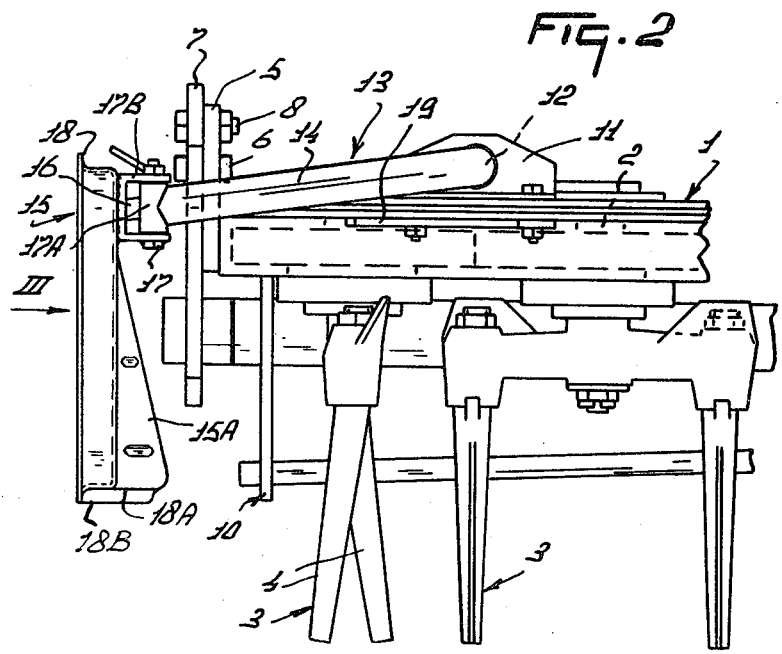
FIG. 2 is a front elevation of one side or end of the implement of FIG. 1, to an enlarged scale, as seen in the direction indicated by an arrow II in FIG. 1.
Figure 3:
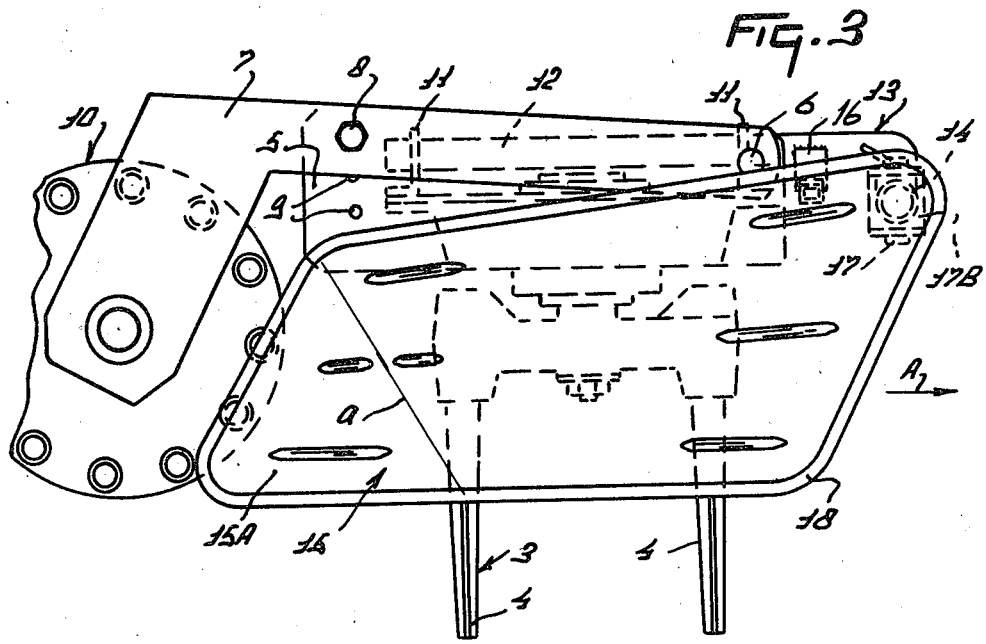
FIG. 3 is a side elevation as seen in the direction indicated by an arrow III in FIG. 2.
Figure 5:
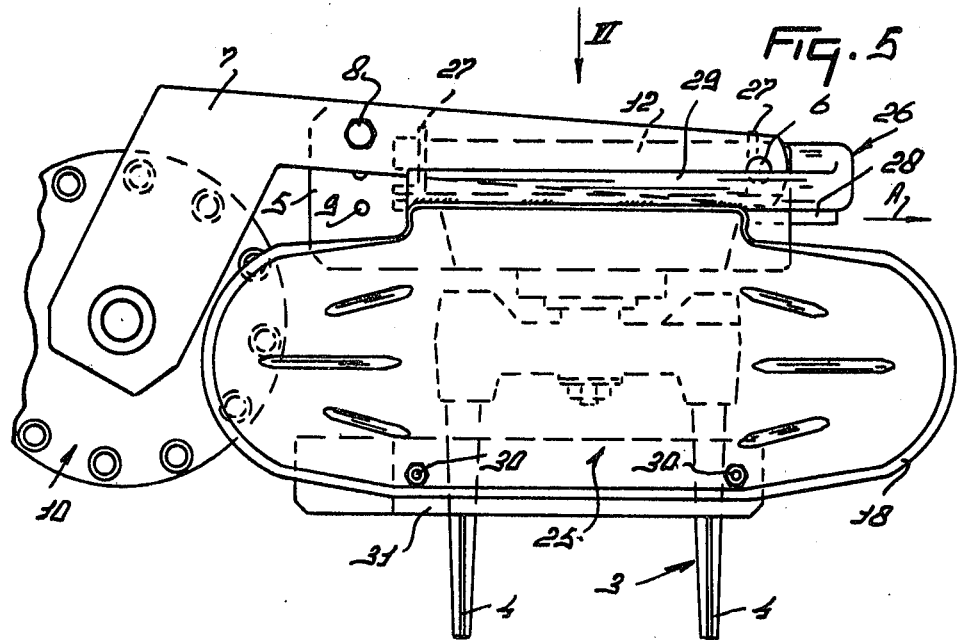
FIG. 5 is a side elevation as seen in the direction indicated by an arrow V in FIG. 4.
Figure 7:
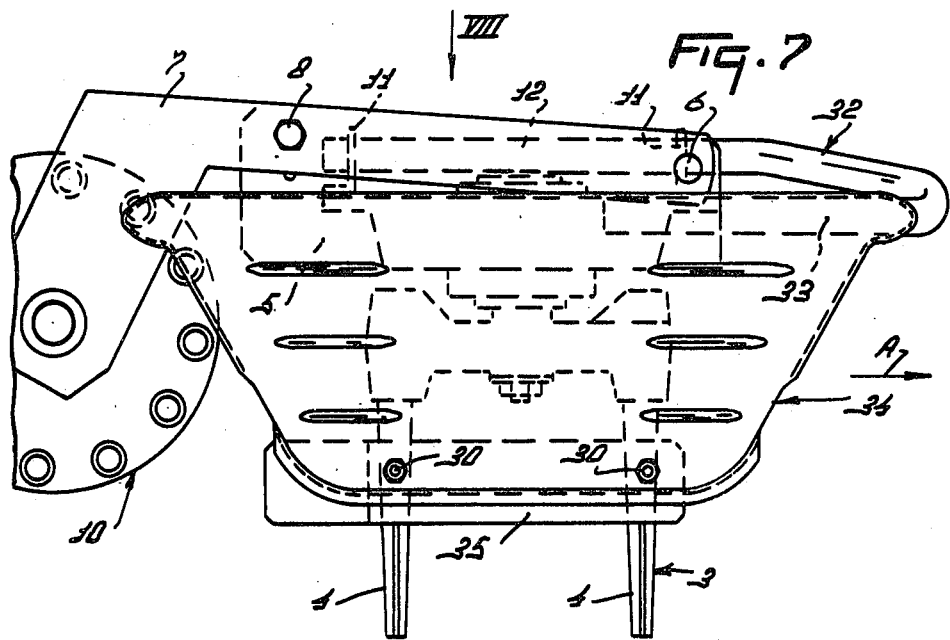
FIG. 7 is a side elevation to the same scale and from the same standpoint as FIGS. 3 and 5 but illustrates a third embodiment in accordance with the invention.
Figure 9:
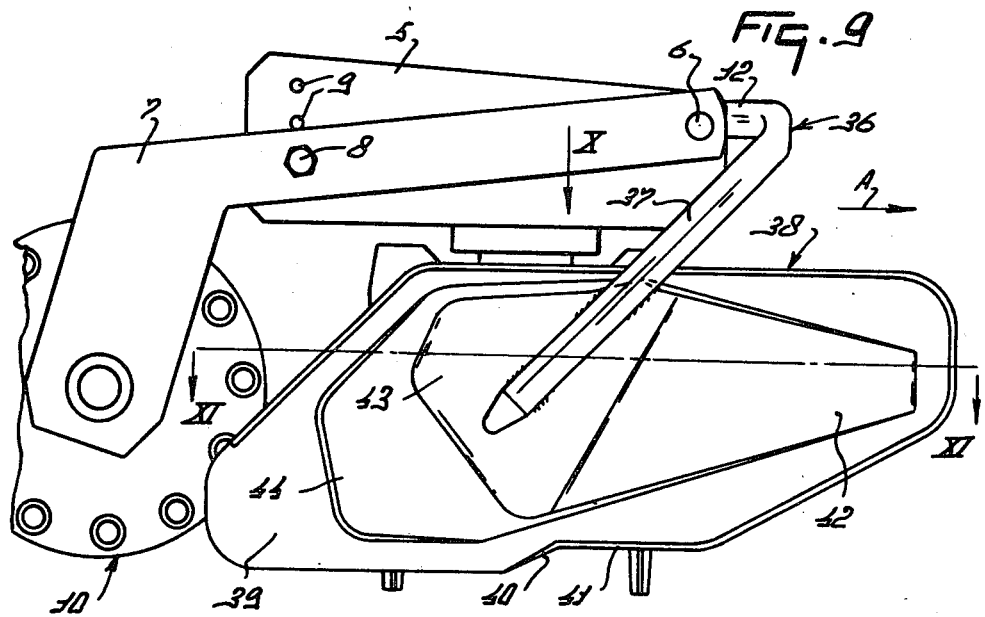
FIG. 9 is a side elevation to the same scale and from the same standpoint as FIGS. 3, 5 and 7 but illustrates a fourth embodiment in accordance with the invention.

Referring to FIGS. 1 to 3 of the accompanying drawings, the soil cultivating implement that is illustrated therein is in the nature of a rotary harrow and comprises a hollow box-section frame portion 1 that extends substantially horizontally transverse and usually, as illustrated, substantially horizontally perpendicular to the intended direction of operative travel of the implement that is indicated in FIGS. 1 and 3 of the drawings, and similarly in FIGS. 5, 7 and 9 thereof, by an arrow A. A plurality, of which there are twelve in the example that is being described, of upwardly extending (non-horizontal) and usually vertically or substantially vertically disposed shafts 2 are rotatably journalled in bearings carried by the upper and lower walls of the frame portion 1 so as to lie in a single row in which the axes of rotation of the successive shafts 2 are spaced apart from one another at regular intervals which advantageously, but not essentially, have magnitudes of substantially centimeters twenty-five. The lowermost end of each shaft 2 projects downwardly from beneath the bottom of the hollow frame portion 1 and is there firmly but releasably provided with a corresponding rotary soil working member 3. Each member 3 has a diametrically opposed pair of cultivating members in the form of rigid tines 4 and the lowermost ends of the two tines 4 of each member are spaced apart from one another by a little greater distance than the spacing between the axes of rotation of immediately neighboring shafts 2 so that, during operation, the strips of land which are worked by the individual members 3 will overlap one another to produce a single broad strip of worked soil which, in the case of the example that is being described, will have a width of substantially, but not necessarily exactly, three meters.

The opposite ends of the hollow frame portion 1 are closed by corresponding side plates 5 that are substantially vertically parallel to one another and usually parallel or substantially parallel to the direction A. The shapes of the side plates 5 can be seen in FIG. 3 of the drawings from which it will be apparent that each plate 5 has a greater vertical extent at the rear thereof, with respect to the direction A, than it does at its front. Each side plate 5 carries a corresponding strong subtantially horizontal stub shaft 6 at a location which is just above the leading extremity, with respect to the direction A, of the hollow frame portion 1, the two stub shafts 6 being in axially aligned relationship. An arm 7 is turnable upwardly and downwardly about each stub shaft 6 and extends generally rearwardly with respect to the direction A from that stub shaft in closely adjacent relationship with the immediately neighboring frame portion side plate 5. Rear regions of the two side plates 5 are formed with curved rows of holes 9 in which each hole 9 is at the same distance from the substantially horizontal axis defined by the aligned stub shafts 6 and each arm 7 is formed with at least one hole at the same distance from said axis so that, by turning the arms 7 upwardly and downwardly about the stub shafts 6, the hole, or at least one of the holes, can be brought into register with a selected hole 9 in the immediately neighboring side plate 5 whereupon a retaining bolt 8 can be entered through the registering holes to be subsequently tightened so that it will maintain the desired angular position of the corresponding arm 7 about the axis defined by the aligned stub shafts 6 reliably and for as long as may be required.

The rearmost ends of the two arms 7 lie behind the row of soil working members 3 with respect to the direction A, being enlarged as compared with the remainders of the arms and being orientated obliquely downwardly and rearwardly. Substantially the lowermost extremities of these rearward portions of the two arms 7 carry substantially horizontally aligned bearings between which an openwork ground roller 10 of skeletal formation is mounted in a freely rotatable manner. The ground roller 10 comprises a central axially extending tubular shaft to which a plurality, such as five, of circular support plates are centrally secured at regularly spaced apart intervals, the skeletal curved ground-engaging surface of the roller 10 being afforded principally by a plurality, such as twelve, of tubular or rod-formation elongate elements which are entered lengthwise through substantially circumferential holes in the roller support plates so as, preferably and as shown in outline in FIG. 1, to extend helically around the longitudinal axis of the roller in regularly spaced apart relationship from one another. The roller 10 provides a maximum depth control function for the tines 4 of the rotary soil working members 3 and serves, in its own right, as a soil working member to crush any lumps of soil exceptionally missed by the members 3 and to produce a gentle smoothing and levelling effect upon the surface of the ground that has immediately previously been dealt with by those members 3.

Two support brackets 11 are secured to the top of the hollow frame portion 1 at the front and rear of that top, with respect to the direction A, at locations towards the opposite ends of said top, it being apparent from FIG. 1 of the drawings that these locations are midway between the first and second shafts 2, counting from each end of the frame portion 1, when the implement is viewed in the direction A. Each of the four support brackets 11 is of L-shaped cross-section having a horizontal limb which is releasably secured to the top of the hollow frame portion 1 and a vertical limb in which a corresponding bearing hole is formed. The bearing holes in the two support brackets 11 near each end of the top of the hollow frame portion 1 are in alignment in the direction A and a horizontal portion 12 of a corresponding carrying arm that is generally indicated by the reference 13 is entered turnably through said bearing holes. The leading end of the horizontal portion 12 of each carrying arm 13 is bent over the through 90° to merge into an oblique portion 14 of the same arm 13, that oblique portion 14 being inclined downwardly and outwoardly (with respect to the center of the implement) away from the integral junction with the respective horizontal portion 12 and having its longitudinal axis contained in a substantially vertical plane that is perpendicular or substantially perpendicular to the direction A.

The free end of the oblique portion 14 of each carrying arm 13 is provided with an upright sleeve bearing 17A, the opposite upper and lower ends of which are embraced by the two limbs of a corresponding forked bracket 17B, an upright clamping bolt 17 being entered through the sleeve bearing 17A and through aligned holes in the two limbs of the bracket 17B. The web or base of each forked bracket 17B is welded or otherwise rigidly secured to the top and front corner region (see FIG. 3) of a displaceable side plate 15 which is actually of irregular quadrilateral shape, having rounded corners, but which can be considered as being approximately rhombic shape. A leading region of each horizontal arm portion 12 and the corresponding displaceable side plate 15 are also interconnected by a telescopic support arm 16 that is parallel or substantially parallel to the oblique portion 14 of the same carrying arm 13. Each support arm 16 is located a short distance rearwardly of the associated oblique portion 14, with respect to the direction A, and is connected to the displaceable side plate 15 concerned at a location adjacent to the uppermost edge thereof (see FIG. 3). The displaceable side plates 15 are turnable, when the clamping bolts 17 are loosened, about the longitudinal axes of those bolts 17 relative to the carrying arms 13 in such a way that rearward portions of the plates 15 can be brought nearer to, or farther away from, the neighboring rotary soil working members 3 and the neighboring ends of the ground roller 10.

The displaceable side plates 15 are basically formed by performing pressing operations upon single pieces of material that may advantageously be metal having a thickness of substantially three millimeters (one-eighth of an inch). The approximately rhombic shape of each side plate 15 is such that, when the implement is viewed in side elevation (FIG. 3), the shorter edges thereof extend obliquely upwardly and forwardly from the lowermost edge thereof with respect to the direction A. The uppermost edge of each plate 15 is gently inclined upwardly and forwardly with respect to the direction A so that said plate has a greater vertical extent at the front thereof, with respect to the direction A, than it does at its rear.

The two side plates 15 are shown in FIGS. 1 to 3 of the drawings as occupying positions in which their surfaces are contained in substantially vertical planes that are parallel or substantially parallel to the direction A and it will be seen from the drawings that each side plate 15 comprises, around substantially the whole of its edge, a perpendicularly bent-over rim 18 that its outermost extremity is bent back through substantially 90° so as to be contained in a plane that is parallel or substantially parallel to that of the body of the side plate 15 itself. The rim 18 includes a horizontal or substantially horizontal portion 18A which perpendicularly, or substantially perpendicularly, joins a vertical or substantially vertical rim portion 18B. The portion 18B forms also part of an inwardly inclined rear part of the plate 15 itself which serves to guide a stream of displaced soil, during the use of the implement, and which will be described in greater detail below. Each of the two symmetrically similar displaceable side plates 15 is strengthened by the provision of stiffening ribs in positions which can be seen in FIG. 3 or the drawings. These stiffening ribs are discontinuous and have separate leading and rear portions. The uppermost rib is parallel of substantially parallel to the uppermost edge of the plate 15 concerned while the lowermost rib is parallel or substantially parallel to the lowermost edge thereof, the center rib being midway between the upper and lower ones and being substantially equally inclined, at a very small angle, to both of them. It will be seen that the rear portion of the center stiffening rib is formed in two short and separate parts at opposite sides of a fold line a which fold line a is the line about which a rearmost portion 15A of the plate 15 concerned is inclined inwardly, relative to the larger remainder thereof, as briefly referred to above. The fold line a extends obliquely downwardly and forwardly, with respect to the direction A, from the upper rear corner of the respective side plate 15 to a location at the lowermost edge thereof which is approximately one-third of the way along said edge from the lower rear corner to the lower front corner thereof.

Each side plate 15 is, during operation of the implement, freely turnable upwardly and downwardly about a horizontal or substantially horizontal axis that is parallel or substantially parallel to the direction A and which coincides with the longitudinal axis of the respective portion 12 of the carrying arm 13 to which it is displaceably secured. Stop plates 19 are mounted at the front of the hollow frame portion 1 in positions in which they will prevent the displaceable side plates 15 from moving too far downwardly about the axes that have just been mentioned by blocking co-operation with the telescopic support arms 16.

Each rotary shaft 2 is provided, inside the hollow frame portion 1, with a corresponding straight-toothed or spur-toothed pinion 20 and the twelve pinions 20, in this embodiment, are of such sizes that each of them has its teeth in mesh with those of its immediate neighbor or both of its immediate neighbors so that, during operation, each pinion 20 in the single row or train thereof will revolve, together with the corresponding shaft 2 and soil working member 3, in the opposite direction to each immediately neighboring similar assembly. It will be seen from FIG. 2 of the drawings that the soil working members 3 are so positioned on the lowermost ends of the shafts 2 that, during operation, immediately neighboring members 3 will not foul one another despite the fact that they are of greater working width than the spacing between the axes of rotation of immediately neighboring shafts 2. One of the center pair of twelve shafts 2, in this embodiment, has an upward extension through a top cover plate of the hollow frame portion 1 into a gear box 21 that incorporates, at its rear, a change-speed gear 22. It is not necessary to describe the construction of the gear box 21 and change-speed gear 22 in any detail for the purposes of the present invention and it suffices to say that a selected one of a number of pairs of intermeshing pinions of different sizes can be mounted in the change-speed gear 22 for co-operation with the splined or otherwise keyed ends of a pair of substantially horizontal shafts to enable the rotary soil working members 3 to be revolved at a faster or slower speed, as may be required, without having to change the initiating speed of rotation that is derived from the rear power take-off shaft of an agricultural tractor or other vehicle via a telescopic transmission shaft 23 (FIG. 1) that is of a known construction having universal joints at its opposite ends. A central region of the front of the hollow frame portion 1, with respect to the direction A, is provided with a coupling member or trestle 24 that is of substantially triangular configuration as seen in front or rear elevation. This coupling member or trestle 24 is constructed and arranged to enable the implement to be connected to the three-point lifting device or hitch at the rear of an agricultural tractor or other operating vehicle in a manner that is shown in outline in FIG. 1 of the drawings. The top and rear of the coupling member or trestle 24 is connected to the top and rear of the hollow frame portion 1 by a pair of steeply divergent downwardly extending tie beams 24A.

In the use of the soil cultivating implement that has been described with reference to FIGS. 1 to 3 of the drawings, the implement is connected by the coupling member or trestle 24 to the three-point lifting device or hitch at the rear of an agricultural tractor or other operating vehicle in the manner that is shown in outline in FIG. 1 of the drawings and a forwardly projecting substantially horizontal rotary input shaft of the gear box 21 is placed in driven connection with the rear power takeoff shaft of the same tractor or other vehicle by way of the known telescopic transmission shaft 23 that has universal joints at its opposite ends. The change-speed gear 22 at the rear of the gear box 21 is adjusted, if necessary, to give a speed of rotation of the soil working members 3 which is appropriate to the nature and condition of the land that is to be worked and to the depth of cultivation that is required. The maximum depth of penetration of the tines 4 of the soil working members 3 into the soil that is possible is adjusted, again if required, by temporarily removing the retaining bolts 8 and turning the arms 7 upwardly or downwardly about the strong stub shafts 6 to bring the holes in those arms into register with appropriate holes 9 in the frame portion side plates 5. The retaining bolts 8 are then replaced and tightened to dictate the level of the axis of rotation of the ground roller 10 relative to that of the frame portion 1 and thus, to a large extent, the greatest depth into the soil to which the tines 4 can penetrate.

As the implement moves in the direction A over land which is to cultivated, the drive from the rotary input shaft of the gear box 21 is transmitted to the twelve, in this embodiment, rotary soil working members 3 via the upward extension of the shaft 2 which corresponds to a substantially central one of them and all of the members 3 revolve in directions which are opposite to the directions of rotation of their immediate neighbour or neighbors. As mentioned above, the twelve members 3 work individual strips of land which overlap one another to produce a single broad strip of worked soil having a width of substantially three meters in the case of the example that is being described. The members 3 at the opposite ends of the single row thereof co-operate with the respectively neighboring displaceable side plates 15 in crumbling and distributing soil displaced by the tines 4 in substantially the same way as occurs by the co-operation of immediately neighboring pairs of members 3 at locations closer to the center of the implement. The side plates 15 also prevent significant ridging at the opposite margins of the broad strip of worked soil. Each displaceable side plate 15 is freely movable about the corresponding axis which coincides with the longitudinal axis of the arm portion 12 concerned and is rigidly connected to that portion 12, when the corresponding bolt 17 is tightened, by a tie which is located in front of the frame portion 1, with respect to the direction A, and which is afforded by the oblique portion 14 of the respective carrying arm 13. Each pivotal axis (portion 12) is substantially horizontally parallel to the direction A and is located above the top of the hollow frame portion 1, the rigid connections between the arm portions 12 and the respective side plates 15 being such as to ensure that the side plates 15 cannot yield outwardly too easily and thus provide the required degree of counterpressure to enable lumps of soil to be crumbled between them and the tines 4 of the respectively neighboring soil working members 3. Nevertheless, should a large stone, hard root remnant or the like become momentarily trapped between one of the displaceable side plates 15 and the tines 4 of the immediately neighboring soil working member 3, that side plate 15 can yield about the axis of the corresponding substantially horizontal arm portion 12, to allow the obstacle to be released in almost all cases before the forces exerted upon the parts of the implement concerned reach such magnitudes as to cause any damage. The cultivating action is interfered with only momentarily, if at all, and is automatically restored as soon as the obstacle has been released.

During the operation of the implement, a stream of displaced soil is, effectively, moved rearwardly with respect to the direction A from the regions of cultivating co-operation between the two displaceable side plates 15 and the respectively neighboring rotary soil working members 3. These streams of soil meet the guides that are afforded by the rear portions of the two side plates 15 that are inclined inwardly about the fold lines a and by the rim portions 18A and 18B, the form of guidance being such that the streams of soil are deflected inwardly towards the respectively neighboring ends of the ground roller 10 so that said roller 10 acts upon this displaced soil and tends not, as can occur with known implements, to form ridges or other accumulations of soil at the margins of the working width of the implement, said ridges or other accumulations extending longitudinally in the direction A. It will be appreciated that the positions of the inclined rear portions of the two displaceable side plates 15 and of the associated rim portions 18A and 18B can be varied relative to the immediately neighboring rotary soil working members 3 and to the opposite ends of the ground roller 10 by means which includes the clamping bolts 17, it only being necessary temporarily to loosen those bolts 17, using the co-operation nuts provided with the lever arms that are illustrated in the drawings, to enable the side plates 15 to be turned inwardly or outwardly, as may be required, the new settings being reliably maintained merely by retightening the bolts 17. Such adjustments are appropriate when, for example, the other adjustments of the implement have been made to increase or decrease the quantity of soil that will be displaced by the implement per unit length of travel in the direction A. The production of the displaceable side plates 15 by pressing operations from single pieces of metal or other material has the advantage that said plates 15 can be made relatively inexpensively while being very strong and particularly resistant to bending. The continuous rims 18 not only effectively stiffen the edges of the plates 15 but also, at the lower edges of the plates, afford the rim portions 18A and 18B, thereby enhancing the guiding effect of the inwardly inclined rear portions of the plates 15.

Figure 4:
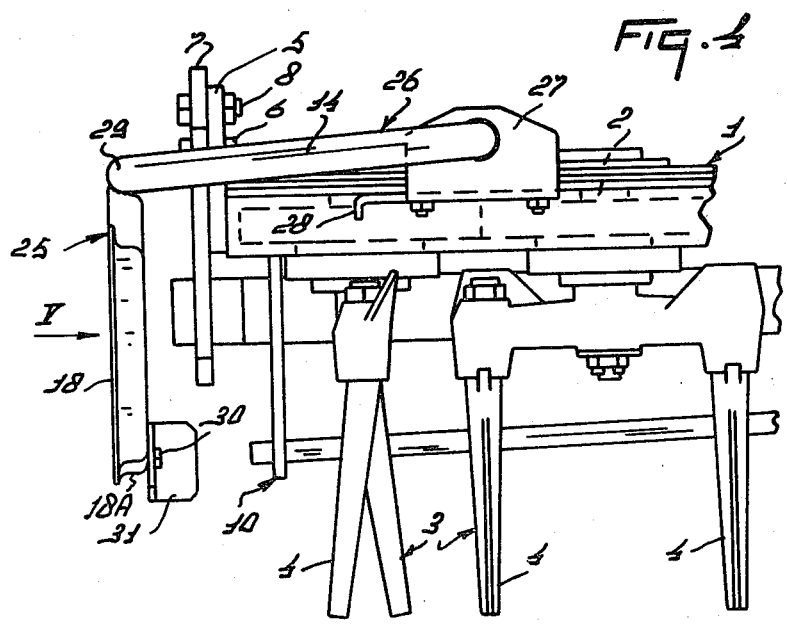
FIG. 4 is a view to the same scale, and from the same standpoint, as FIG. 2 but illustrates an alternative embodiment.
Figure 6:
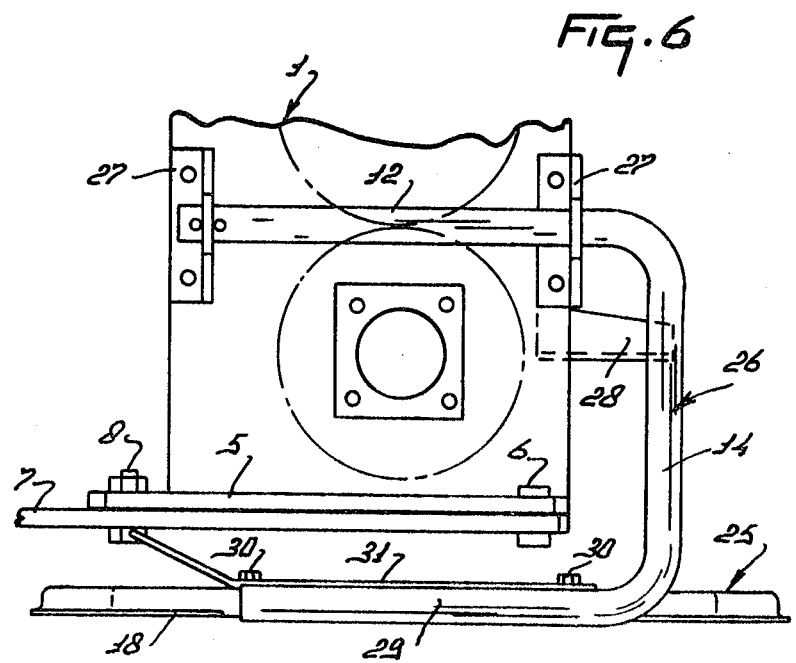
FIG. 6 is a plan view as seen in the direction indicated by an arrow VI in FIG. 5.

FIGS. 4 to 6 of the drawings illustrate a construction in which the carrying arms 13 are replaced by carrying arms 26 that are of different shapes but which nevertheless include the previously described portions 12 and 14. The portions 12 are turnable upwardly and downwardly in brackets 27 that are basically similar in construction and mounting to the previously described brackets 11. Stops 28 project from the front of the hollow frame portion 1, with respect to the direction A, alongside the leading brackets 27 and, in this embodiment, co-operate with the oblique portions 14 of the carrying arms 26 in preventing those arm portions 14 and corresponding side plates 25 from turning too far downwardly about the longitudinal axes of the arm portions 12. In this embodiment, the outer end of each oblique arm portion 14 is integrally connected by a substantially 90° bend (see FIG. 6) to an outer portion 29 which is substantially horizontally parallel to the corresponding portion 12 and which is directed rearwardly, from its integral connection to the portion 14 concerned, with respect to the direction A. The side plates 25 are again preferably made from single pieces of metal or other material by a pressing operation but it will be apparent from FIG. 5 of the drawings, in particular, that the side plates 25 are symmetrical about a central vertical axis so that a single version of the side plate 25 is appropriate for use at both lateral sides or ends of the implement. The shape is, in fact, basically, although not exactly, oval, both the upper and lower edges thereof comprising substantially parallel straight portions. The straight portion of the upper edge of each side plate 25 is welded or otherwise rigidly secured to the corresponding outer arm portion 29. Once again, the substantially continuous rim 18 is provided throughout the edge of each side plate 25, said rim 18 comprising the two relatively perpendicular portions which respectively extend substantially perpendicular, and substantially parallel, to the general plane of the body of the plate 25 concerned. Only in the upper straight edge portion of each side plate 25 is the perpendicularly outwardly projecting portion of the rim 18 of that plate missing so that it will not interfere with the welded or other rigid connection thereof to the outer portion 29 of the co-operating carrying arm 26. Once again, each displaceable side plate 5 is strengthened by the provision of outwardly embossed or pressed stiffening ribs which ribs, as can be seen in FIG. 5 of the drawings, are formed in two groups of three in leading and rear regions of each plate 25, respectively, the three ribs of each group being arranged with the upper and lower ribs thereof inclined towards one another in the general direction of the leading or rear extremity of the plate 25 but with the central rib substantially horizontally disposed.

A lower region of each side plate 25 is releasably provided, by way of two bolts 30, with a corresponding guide 31 that is located alongside the inner surface of the plate 25 concerned. Each guide 31 is in the form of an elongate plate that extends throughout a major part of the length of the lower edge of the side plate 25 concerned, the guide 31 having an inwardly inclined bent-over portion at its rearmost end, with respect to the direction A, so that this portion will co-operate, during operation, with a stream of displaced soil to deflect that stream laterally inwards towards the neighboring end of the ground roller 10. Instead of being rigidly secured to the outer portion 29 of the corresponding carrying arm 26, as illustrated, each side plate 25 may be adjustable in position relative to that portion 29 about a vertical or substantially vertical axis employing a clamping bolt or the like arranged in a similar manner to the clamping bolts 17 of the embodiment of FIGS. 1 to 3 of the drawings.

Figure 8:
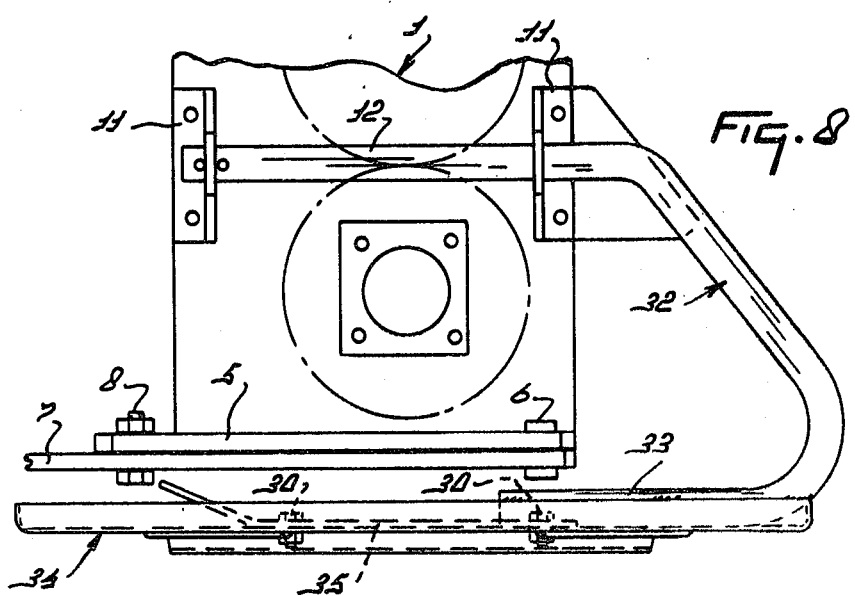
FIG. 8 is a plan view as seen in the direction indicated by an arrow VIII in FIG. 7.

FIGS. 7 and 8 of the drawings illustrate a third embodiment in accordance with the invention in which carrying arms 32 are substituted for the previously described carrying arms 13 or 26. It will be seen from the drawings that each carrying arm 32 once again comprises the substantially horizontal portion 12 that extends parallel or substantially parallel to the direction A and a relatively parallel outer portion 33 that is integrally coupled to the portion 12 by an oblique portion which is not, however, in perpendicular relationship with the two portions 12 and 33 but which is inclined outwardly and forwardly, with respect to the direction A, from the leading end of the horizontal portion 12 to merge into the leading end of the outer portion 33 by way of a bend having a magnitude that is in excess of 90° and that advantageously has a magnitude of substantially 120°. The outer portion 33, which is directed rearwardly from said bend with respect to the direction A, is welded or otherwise rigidly secured to an upper leading edge region of a corresponding displaceable side plate 34 which, as in the case of the preceding embodiment, is of symmetrical shape about a vertical axis thus enabling a single version to be employed at both opposite lateral sides or ends of the hollow frame portion 1. As can be seen in FIG. 7 of the drawings, each side plate 34 is of approximately, although not exactly, inverted trapeziform shape having straight and substantially parallel upper and lower edges. The front and rear edges thereof, with respect to the direction A, are upwardly and forwardly and upwardly and rearwardly, respectively, inclined from the lower edge to the upper edge, a rounded projection that does not conform with the true trapezoidal shape being formed at the two leading and rear upper corners of the plate.

The upper edge of each side plate 34 is provided with an inwardly directed perpendicular bent-over rim which also extends around said projections and downwardly along the inclined leading and rear edges of the plate to locations which are approximately, but not exactly, midway between the upper and lower edges of said plate. In addition to being formed from single pieces of metal or other sheet material by pressing operations, the side plates 34 also have embossed or pressed stiffening ribs which, as can be seen in FIG. 7 of the drawings, are arranged in two groups of three ribs each towards the front and rear edges, respectively, of each plate 34. All six of the ribs extend parallel or substantially parallel to the upper and lower edges of the corresponding plate 34 and a substantially equal spacing is provided between those edges and the most closely adjacent ribs and between the successive ribs themselves in each group. The lower edge of each side plate 34 also exhibits a perpendicularly bent-over rim which, as in the case of the upper rim, is of similar formation to the rim 18 that is provided in the first embodiment. As in the case of the embodiment of FIGS. 4 to 6 of the drawings, the inner surface of a lower region of each side plate 34 has a corresponding guide 35 firmly but releasably secured to it by a pair of bolts 30 which are spaced apart from one another in the direction A. As in the case of the guides 31, each guide 35 has a rearmost inwardly bent-over portion which, in the use of the implement, will direct a stream of displaced soil laterally inwardly towards the neighboring end of the ground roller 10. Once again, if desired, the rigid connection of each side plate 34 to the outer portion 33 of the corresponding carrying arm 32 may be replaced by a form of connection in which said plate 34 is angularly adjustable relative to the outer portion 33 about a vertical or substantially vertical axis that may conveniently be afforded by the longitudinal axis of a clamping bolt arranged in the manner of the clamping bolts 17 of the embodiment of FIGS. 1 to 3 of the drawings. As can be seen in FIG. 8, the horizontal limb of the leading bracket 11 of each pair is shaped to afford a stop to co-operate with the lower surface of the oblique portion of the corresponding carrying arm 32 to prevent that arm, and the corresponding side plate 34, from moving too far downwardly during the operation of the implement and, incidentally, as in the cases of the previously described stops, when the implement is raised above the ground by the three-point lifting device or hitch of a tractor or other operating vehicle to which it is connected for inoperative transport purposes.

Figure 10:
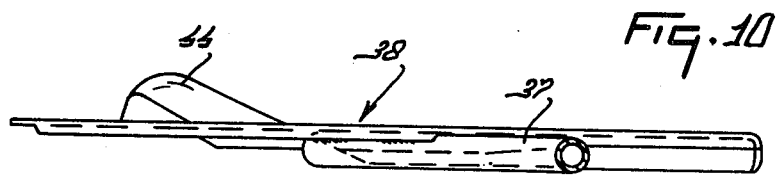
FIG. 10 is a sectional plan view of part of the implement as seen in the direction indicated by an arrow X in FIG. 9.
Figure 11:
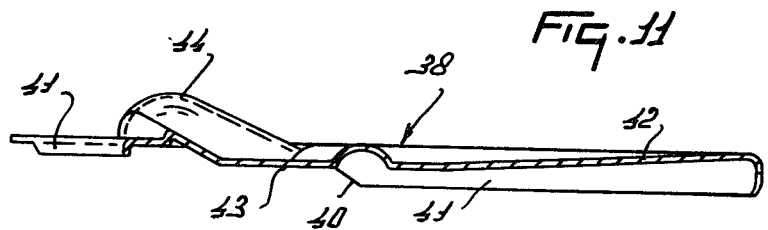
FIG. 11 is a section taken on the line XI—XI in FIG. 9.

FIGS. 9, 10 and 11 of the drawings illustrate a further alternative embodiment in which a carrier arm 36 is provided that includes the previously described horizontal portion 12 arranged in the same manner as for the embodiments that are described above. However, the leading end of the horizontal portion 12 of each arm 36 merges by way of a bend into an arm portion 37 which is inclined downwardly, outwardly and rearwardly with respect to the direction A. A free end region of the arm portion 37 is welded or otherwise rigidly secured to a corresponding displaceable side plate 38 and it will, of course, be understood that the opposite lateral side or end of the implement will usually be provided with a symmetrically similar or identical side plate 38. Once again, the side plate 38 is formed from a single piece of sheet metal or other material by a pressing operation and it will be seen from FIG. 9 of the drawings that said plate 38 initially increases in vertical width from its front in a rearward direction and then merges into a portion which is of substantially uniform vertical width for some distance while finally forming a rearmost portion 39 that decreases in vertical width towards its rearmost end. The plate 38 is of an irregular shape having a straight and substantially horizontally disposed upper edge which merges, at its rear end, into a downwardly and rearwardly inclined straight edge portion that is at an angle of substantially 45° to the horizontal and the vertical, this latter portion merging by way of a curve into a short substantially vertical rearmost edge having a lower end which, in turn, merges by way of a further curve into a straight and substantially horizontally disposed lower rear edge portion. The leading end of this lower rear edge portion joins, by way of an angular bend, a short upwardly and forwardly inclined lower edge portion 40, the leading and upper end of which joins a straight and substantially horizontally disposed lower edge portion. The leading end of the lower edge portion, in turn, joins an upwardly and forwardly inclined edge portion with an upper leading end which merges, by way of a curve, into a relatively short substantially vertically disposed leading edge. The upper end of the leading edge is joined by a further 90° curve to the leading end of the straight and substantially horizontally disposed upper edge of the plate 38. It will be noted from FIG. 9 of the drawings that the upwardly and forwardly inclined lower edge portion 40 is located just rearwardly to the center of the plate 38, having regard to its length in the direction A, whereas the short substantially horizontally disposed lower edge portion that lies immediately in front of it has a length in the direction A which is substantially one-third of the distance between its rearmost end and a location coinciding, in the direction A, with the leading substantially vertical edge of the plate 38. A bent-over rim 41 with a shape that can be seen in FIGS. 9 to 11 of the drawings is provided throughout substantially all of the edge portions of the plate 38 except in the rearmost substantially vertical edge thereof, the adjoining substantially horizontal lowermost edge thereof and throughout the curved edge which joins those two portions. The rim 41 is bent over outwardly away from the center of the implement. The rim 41 of the short lower substantially horizontal edge portion which is located immediately in front of the inclined edge portion 40 constitutes a substantially horizontal guide part of the plate 38 with the rearmost portion 39 of that plate located behind it, with respect to the direction A, to constitute a downwardly extending substantially vertical portion. The side plate 38 includes a central embossed portion 42 which is inclined outwardly away from the center of the implement in a progressive manner from its front towards its rear considered in the direction A (see FIG. 11). The surface of the embossed portion 42 is essentially flat and its vertical width increases from front to rear. The embossed portion 42 terminates, at its rear and substantially centrally of the whole plate 38, in a flat part 43 with a surface which is in a parallel or substantially parallel relationship with the general plane of the outer edge of the side plate 38. FIGS. 10 and 11 of the drawings show that the flat part 43 is formed with an inwardly directed elongate recess of cylindrically curved sectional shape to receive the portion 37 of the corresponding carrying arm 36 in which recess said portion 37 is welded or otherwise rigidly installed.

The rear of the flat part 43 terminates in an inwardly embossed portion 44 having an inner surface which acts as an inwardly bent-over guide that is of rearwardly tapering formation. The lower extremity of the embossed portion 44 is substantially horizontally disposed and is at the same level as the rim 41 of the substantially horizontal lower edge portion of the plate 38 itself that is located immediately in front of the upwardly inclined lower edge portion 40. Said lower extremity of the portion 44 is integral with the downwardly extending substantially vertical portion 39 of the plate, the latter extending down to a lower level than the bottom of the embossed portion 44 and constituting, in this embodiment, also a stabilizing member. The embossed portion 44, in particular, of the displaceable side plate 38 acts to deflect an effectively rearwardly moving stream of displaced soil laterally inwardly of the implement towards the neighboring end of the ground roller 10 in much the same way as has previously been described for the rear portions of the side plates 15 and the inwardly bent-over portions of the guides 31 and 35.

The substantially horizontal portions of the various displaceable side plates which have been described co-operate with the rear portions of the plates 15 or with the guides 31 or 35 or with the embossed portions 44 in ensuring that displaced soil will be effectively guided laterally inwardly, in a substantially optimum manner, towards the neighboring end of the ground roller 10 of the implement. It will be noted from FIGS. 3, 5, 7 and 9 of the drawings that the laterally inwardly bentover portions of the various guides are all located approximately, as seen in side elevation, in register with the rearmost extremities of the circular paths which are traced by the tines 4 of the soil working members 3 during rotation of the latter. In the embodiment of FIGS. 9 to 11 of the drawings, the arm portion 37 is in substantially parallel relationship with the downwardly and rearwardly inclined edge portion of the plate 38 which interconnects the rear end of the upper edge thereof and the upper end of its substantially vertical rearmost edge. The lower end of the arm portion 37 and the lower end of the substantially parallel edge portion of the plate 38 that has just been referred to are, it will be seen from FIG. 9 of the drawings, located at substantially the same horizontal level. Once again, it is not essential that the displaceable side plate 38 should be rigidly secured to the arm portion 37. If desired, it may be adjustable in relation thereto about an upright axis that may conveniently, but not essentially, be the axis of a clamping bolt disposed in the same general way as has been described with reference to FIGS. 1 to 3 of the drawings. The various embodiments which have been described enable displaceable side plates to be formed inexpensively but so as to be relatively strong. These plates co-operate in working the soil with the respectively neighboring soil working members 3 at the opposite ends of the row thereof and their arrangement is such that, while not being so easily displaced that they will not provide the required degree of counterpressure for co-operation with the soil working members 3, they can still be moved, before damage occurs, in the event of a stone or other hard obstacle becoming momentarily jammed between one of them and the tines 4 of the co-operating rotary soil working member 3. In the embodiments of FIGS. 4 to 8 of the drawings, the displaceable side plates 25 and 34 are symmetrical about corresponding substantially vertical axes thus enabling a single version thereof to be used at the opposite lateral sides or ends of the implement which simplifies manufacture by avoiding the necessity for symmetrical "right-hand" and "left-hand" versions. The releasably mounted guides 31 and 35 in these versions are of very simple shape and again only require a single version which can be mounted at either lateral side or end of the implement merely be relative inversion. Should the guides 31 or 35 become damaged or excessively worn, they can quickly, easily and inexpensively be replaced.

Although certain features of the various soil cultivating implement embodiments described or illustrated or both in the accompanying drawings will be set forth in the following claims as inventive features, it is emphasized that the invention is not necessarily limited to such features and may include within its scope the disclosed parts of each soil cultivating implement version, both individually and in various combinations.

Having disclosed my invention, what I claim as new and to be secured by Letters Patent of the United States is:

1. A soil cultivating implement comprising a frame and a row of soil working members mounted along the length of an elongated portion of said frame, a roller interconnected to said frame to support said frame portion and said roller being located to the rear of that portion, at least one side plate displaceably mounted on said frame adjacent a lateral side of said row to deflect soil being worked inwardly towards said roller, said plate having a lower substantially horizontal portion that extends in the general direction of implement travel during operation, said plate being pivoted to the top of said frame portion by an arm, a horizontal portion of said arm extending forwardly from bracket means on said frame portion to a laterally and outwardly extending arm portion that is connected by fastening means to a forward part of said plate, the trailing end of said plate extending freely to the rear and said fastening means being adjustable to move said trailing end nearer to or farther from said roller, a stop on said frame portion being positioned to prevent said side plate from pivoting too far downwardly when the implement is in operation or is undergoing inoperative transport, said stop being located in front of said frame portion, a telescoping support arm interconnecting the forward part of said plate to said frame and said support arm being located adjacent said outwardly extending arm position, said support arm cooperating with said stop to arrest the downward displacement of said side plate.

2. A soil cultivation implement according to claim 1 wherein said plate has a downwardly extending rear portion adjacent said horizontal portion, said rear portion extending inwardly towards the implement center.

3. An implement as claimed in claim 2, wherein said rear portion adjoins an edge of the horizontal portion and said edge extends substantially parallel to the direction of travel.

4. An implement as claimed in claim 2, wherein said rear portion adjoins said edge and the latter is innermost with respect to the center of the implement.

5. An implement as claimed in claim 4, wherein said rear portion comprises an elongate plate member with a trailing end that is bent over obliquely inwardly.

6. An implement as claimed in claim 5, wherein said plate member is releasably secured to said side plate by fastening means.

7. An implement as claimed in claim 5, wherein said plate member extends along substantially the lower edge of said side plate and said edge normally contacts the ground during operation.

8. An implement as claimed in claim 5, wherein each said soil working member comprises at least one rotor that rotates about an upwardly extending axis and when the implement is viewed in side elevation, the junction between the trailing end of said plate member and the remainder of the plate member is in substantial register with the rearmost extremities of the path of rotation traced by the rotor.

9. An implement as claimed in claim 2, wherein the leading part of the side plate has a greater vertical height extent than does the rear part thereof.

10. An implement as claimed in claim 2, wherein said arm is pivoted to said frame so as to be turnable about an axis located above said frame portion, at least part of said arm being located in front of the frame portion.

11. An implement as claimed in claim 1, wherein said fastening means is a forked bracket and sleeve bearing connection that enables the side plate to be pivoted about an upwardly extending axis, means securing said plate in any one of a plurality of positions about said axis.

* * * * *